United States Patent Office 2,970,437
Patented Feb. 7, 1961

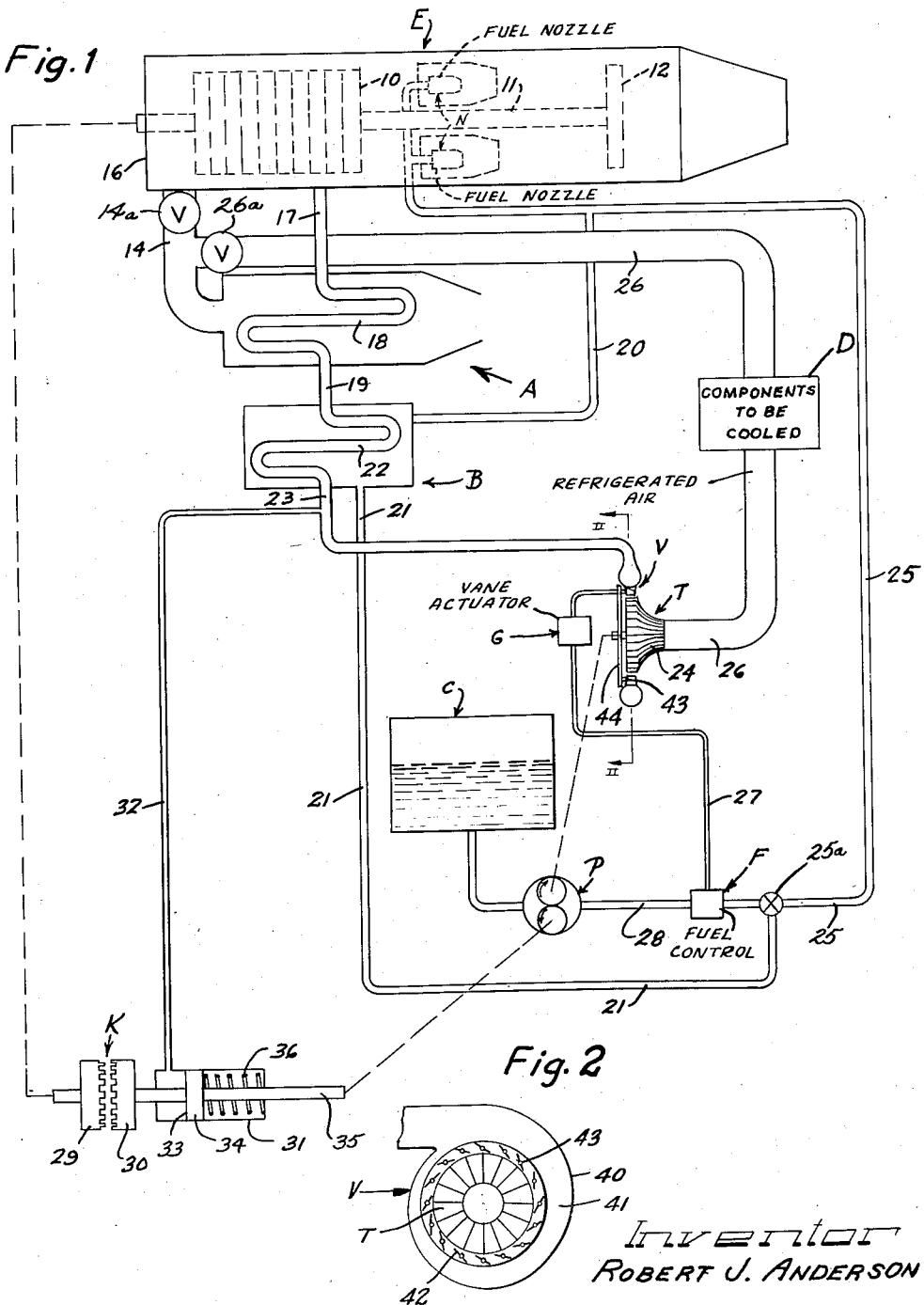

2,970,437

HIGH TEMPERATURE PUMPING SYSTEM WITH VARIABLE SPEED PUMP AND REFRIGERATION BY-PRODUCT

Robert J. Anderson, Wickliffe, Ohio, assignor to Thompson Ramo Wooldridge, Inc., a corporation of Ohio Filed Feb. 28, 1956, Ser. No. 568,337

6 Claims. (Cl. 60—39.66)

This invention relates to a pumping system which minimizes heating of the material being pumped and also produces a coolant from the pump driving fluid. Specifically, this invention relates to a turbojet engine fuel system that is adapted to be driven by cooled bleed air from the engine without undesirable recirculation and heating of the fuel, and that is also capable of producing refrigerated air to cool other engine or aircraft components.

As a result of the ever increasing operating range demands and output capacities being imposed on the fuel pumping system of modern jet aircraft and missiles, coupled with an increasing complexity of instrumentation and associated reduction in available space in the aircraft, a critical heating problem has arisen, not only as to the fuel pumping system and related plumbing, but also as to adjacent components in the aircraft, due to the inadequacy of ambient cooling.

In addition, substantial heating occurs in the taking aboard of ram air at supersonic speeds to the point that sufficient cooling from this source can no longer be expected, particularly at extremely high speeds and altitudes.

It is thus apparent that some additional cooling source must be resorted to, other than ambient or ram air cooling, in order to maintain a safe operating temperature for critical aircraft components, particularly as to the fuel in the fuel pumping system, where an incremental temperature increase results due to the pumping action.

Further, as the specific fuel consumption of a typical turbojet engine powered aircraft is progressively reduced as the aircraft goes to altitude, it also is apparent that any provision for proportionately reducing the pumping speed of the fuel pump in accordance with flow requirements, will eliminate a large amount of the incremental heating caused by recirculation of the fuel.

It is also apparent that any power source or fuel pumping system which will generate a relatively refrigerated by-product, as an incident to its pumping cycle, will extend the effective operating limits of the fuel pump system and adjacent components even farther than by merely eliminating overcapacity recirculation.

The present invention offers a solution to this problem in the form of an air driven, variable speed turbine fuel pump in which the turbine speed and pump output are varied to correspond to a particular flow requirement and where the relatively cold discharge air from the turbine is utilized to cool other components in the aircraft, as a result of the cooling effects obtained by the expansion of the air through the turbine blades.

Briefly described, the present invention contemplates a variable speed air turbine driven fuel pump in which bleed air from a turbojet engine drives a variable area turbine to drive the fuel pump. The rotative speed of the air driven turbine pump is controlled by proportionate variations in the area of the nozzles, which direct the compressed bleed air flow into the turbine. The area of the nozzles is controlled by an actuator, which in turn responds to variations in fuel flow requirements of the engine at any particular time.

Provision is also made in the present invention for an intermediate heat exchanger, which utilizes ram air, fuel or a supply of cool exhaust air from the air turbine, the latter being part of a regenerative cooling system producing limited amounts of relatively cold air, as contrasted to large amounts of relatively cool air produced by a ram air cooled or fuel cooled non-regenerative cooling system for bleed air from the engine. The regenerative cooling system, which contemplates the circulation of cool turbine discharge air around the hot pressurized bleed air conduit from the compressor, produces a limited flow of comparatively cold air which may be used to cool one or more high temperature critical components.

Expanded, cooled air, discharging from the turbine is then collected and communicated to adjacent components in the aircraft as an additiontal cooling means to ambient cooling.

Bleed air is also utilized to disengage a clutch which mechanically connects the air turbine driven pump to the main shaft of the engine, until a sufficient bleed air pressure increment is developed which is sufficient to drive the air turbine and coupled fuel pump at rated speed, whereupon the clutch will disengage and the fuel pump will be operated solely from the bleed air acting on the turbine blades.

It is an object of the present invention to provide an improved pumping system for a turbojet engine.

Another object of the present invention is to provide a high-temperature pumping system in which the pump speed and output is proportionately variable according to the flow demands on the system.

A further object of the present invention is to provide an improved high-temperature air turbine driven fuel pumping system having variable area turbine nozzles which are proportionately regulatable to control the speed and output of the pump in response to a varying fuel flow requirement.

A still further object of the present invention is to provide a source of relatively cold air for cooling high temperature critical components in an aircraft which are subject to a high-temperature operating environment by utilizing the expanded discharge air from the turbine of an air turbine driven fuel pumping system.

Yet another object of the present invention is to provide a regenerative cooling system for temperature critical components in an aircraft which are subject to a high-temperature operating environment by utilizing relatively cool discharge air from an air turbine driven fuel pump as a heat sink to cool hot pressurized bleed air from a turbojet engine which is utilized to drive the air turbine pump.

Many other important objects and advantages will be realized by those versed in the art upon making reference to the detailed description which follows and the accompanying sheet of drawings.

On the drawings:

Figure 1 illustrates in schematic and diagrammatic form a typical variable speed air turbine driven fuel pumping system, according to the principles of the persent invention, showing by way of a preferred example only, one particular arrangement of the basic components and elements of the principal invention. The components of the pumping system are represented in diagrammatic form in order to more simply depict the fundamental relationships and positions of the separate components of the system, in the light of the more detailed description which follows; and Figure 2 is a fragmentary diagrammatic view, partly in section, and taken substantially along the line II—II of Figure 1, illustrating a typical variable area nozzle assembly, such as is used to regulate fluid flow to the air turbine of the invention.

As shown on the drawings:

In Figure 1, the fuel pumping system is comprised generally of a typical axial flow turbojet engine E, having a multistage axial flow compressor 10, a connecting drive shaft 11, and a turbine wheel 12, coaxial with the compressor assembly 10. A ram air conduit 14 communicates ram air from an inlet 16 of the turbojet engine E, or from some other suitable inlet source on the aircraft, to a ram air heat exchanger A.

A bleed air conduit 17 communicates pressurized bleed air from some point of high interstage compression in the compressor assembly 10, to a cooling conduit 18 in the ram air heat exhanger A.

Pressurized bleed air in the conduit 17 is at a substantially elevated temperature, due to the compression process through the compressor assembly 10, and may be intermediately cooled in order to reduce the temperature rise at the point of utilization.

After passing through the cooling conduit 18 in the ram air heat exchanger A, the bleed air is communicated through a connecting conduit 19 to a second stage fuel heat exchanger B, where the temperature of the bleed air is again reduced.

The fuel heat exchanger B receives a flow of pressurized cool fuel from the downstream side of a fuel control device F of any of the commercially available types, through a conduit 21, the fuel being retained in a fuel cell C, which communicates with a fuel pump P, which may also be of any of the commercially available forms, preferably a positive displacement gear type, through a main fuel conduit 28. Heated fuel is returned through a conduit 20 to a main fuel line 25 leading to a fuel nozzle assembly N, which may be positioned in the main combustion chambers or after burner combustion chamber of the engine E. A valve 25a in the main fuel line 25, between the conduits 20 and 21, proportions flow through or around the heat exchanger B as desired. A cooling coil 22 is provided in the fuel heat exchanger B to transfer thermal energy from the bleed air to the surrounding cool fuel, similar to the cooling conduit 18 in the ram air heat exchanger A.

It should be appreciated that while a two-stage cooling cycle for the pressurized bleed air is illustrated in Figure 1, a single-stage cooling cycle, using only ram air or fuel might be employed, depending on the cooling reqirements of a particular installation.

After passing through the ram air heat exchanger A and fuel heat exchanger B, the bleed air is in a substantially cooler state than when originally bled off of the compressor 10, without an appreciable loss in pressure.

A connecting conduit 23 then communicates the relatively cold bleed air to a variable area turbine nozzle assembly V, through which it is directed into a vane assembly 24 of an air driven turbine T. Low velocity bleed air leaving the vanes 24 of the turbine T is at a relatively refrigerated temperature as contrasted to the surrounding components which is indicated by legend of Figure 1. A collecting conduit 26 receives the refrigerated air from the turbine T, where it is then communicated to temperature critical components as indicated in Figure 1 at D.

As an incident to the work done by the bleed air in driving the turbine T, a substantially large reduction in the entropy of the bleed air occurs in the form of a large temperature drop, which is an extremely desirable result in that a relatively cold air source is produced which may be very effectively utilized to cool the fuel pump or other adjacent accessories subject to critical operating temperatures.

In order to obtain speed control of the turbine T and coupled fuel pump P, a variable area turbine nozzle assembly V, has been provided, in which the nozzle area is controlled by an actuator G, which receives a proportioning signal through a conduit 27 from a fuel control device F. A fuel conduit 28 communicates fuel from a fuel cell C through the pump P to the fuel control device F.

As best shown in Figure 2 in conjunction with Figure 1, the variable area turbine nozzle assembly V may include for example, a housing 40, that encloses the turbine T and defines a volute chamber 41, therearound. The housing 40 also encloses a ring of pivotally mounted vanes 42 having axially extending shaft portions 43, which register with the volute chamber 41, and which are movable in response to rotational movements of a control ring 44 (Fig. 1), that is connected to the vanes 42, through suitable linkage. Movement of the control ring 44 is accomplished by the actuator G, which thereby effects a proportionate movement of the vanes 42 to thus control the area of the nozzle asembly V and the amount of driving fluid being impinged on the turbine T.

The fuel control device F is sensitive to engine parameters such as speed, temperature, surge line, and differential pressure, singly and concurrently. As the engine speed setting is changed, a change in fuel flow is required to reduce the error between the set value and the actual speed or temperature. The compensating change in fuel flow is accomplished, for example, through the fuel control device F connecting conduit 27 and actuator G, the actuator G receiving a corrective signal from the fuel control device F which is translated to the nozzles of the variable area nozzle assembly V, to effect a proportionate increase or reduction in the effective nozzle area of the variable area nozzles, thereby either limiting or increasing the amount of bleed air impinging on the vanes 24 of the turbine T, with a corresponding reduction or increase in the speed of the turbine T and fuel pump P until an equilibrium condition is restored.

Where it is desirable to obtain a limited amount of comparatively cold air for a particular temperature critical component to be cooled, the cooling system illustrated in Figure 1 may be converted to a regenerative type, by utilizing the cool air discharge from the cooled components as the cooling medium for the hot bleed air entering the ram air heat exchanger A.

The regenerative cooling system is formed by providing a valve 14a in the ram air conduit 14 and a valve 26a in the cold air return conduit 26. The valve 14a is closed and the valve 26a is opened to operate the cooling system of the present invention on a regenerative cycle.

When the valve 14a is closed, no ram air will enter the heat exchanger A, instead, the open valve 26a in the return conduit will direct the full discharge flow of cool turbine air leaving the cooled components through the heat exchanger A, thereby providing a limited supply of substantially colder air to cool the bleed air from the compressor in the cooling conduit 18 and thus obtain a much cooler flow of turbine discharge air than would be available by using ram air as the cooling medium.

It will thus be appreciated that the regenerative cooling cycle shown in Figure 1 makes possible a much colder flow of refrigerated discharge air from the turbine T, though in limited quantities, due to the small flow volume of air turbine discharge air, as compared to the available flow volume of ram air in the conduit 14 when the valve 14a is fully open.

Thus it will be appreciated that the fuel pump system illustrated in Figure 1, discloses a variable speed air turbine driven fuel pumping system which delivers a variable fuel flow in accordance with engine demands, without the disadvantages of excessive heating of the fuel due to recirculation when flow requirements are reduced, and which produces a beneficial cold air discharge by-product that may be utilized to cool other engine components.

In order to provide a fuel supply at idling or low compressor speeds, or where the bleed air pressure is insufficient to maintain a predetermined minimum turbine speed, a mechanical clutch assembly K is provided to establish a direct drive between the fuel pump P and main compressor shaft 11 of the turbojet engine E, until a predetermined minimum bleed air pressure is obtained, whereupon the clutch assembly K will disengage the fuel pump P from the main compressor shaft 11 as the bleed air pressure on the vanes 24 of the air turbine T will then be sufficient to maintain the fuel pump P at operating speed.

The clutch assembly K is comprised of a pair of meshing gears or clutch plate members 29 and 30 respectively, which form the mechanical connection between the main compressor shaft 11 and fuel pump P.

Disengagement of the clutch member 30 from the clutch member 29 is obtained, for example, through a bleed air operated cylinder and piston assembly 31 in which a bleed air conduit 32 communicates bleed air against a responsive face 33 of a piston 34 in the cylinder assembly 31. A drive shaft 35 maintains a predetermined spaced relationship between the clutch member 30 and piston 34 and is suitably linked to the pump P to permit a driving engagement through the clutch assembly K with the compressor rotor shaft 11. A coil spring 36 initially urges the piston 34 and clutch plate member 30 into an engaged position with the clutch member 29. As the rotational speed of the compressor assembly 10 increases, a corresponding rise in bleed air pressure will occur in the conduit 17 and connecting conduit 32. A progressively increasing bleed air pressure on the face 33 of the piston 34 will then occur until the bleed air pressure attains a predetermined value sufficient to overcome the compression in the coil spring 36, whereupon the clutch member 30 will disengage from the clutch member 29 thereby breaking the mechanical connection between the fuel pump P, and compressor shaft 11.

The compression force of the spring 36 on the piston 34 is sufficient to maintain a mechanical engagement between the fuel pump P and compressor drive shaft 11 until the bleed air pressure across the variable area turbine nozzle assembly V will maintain the turbine T, at rated speed.

It should be appreciated that while a mechanical clutch assembly K is shown as exemplary of a means for initially obtaining an output from the pump P before the turbine T becomes operative, it should be understood that any other system might be used to drive the pump P until the air turbine T becomes operative.

Therefore, in operation of the system of this invention, compressed air is bled off of the last stages of the compressor 10 in the turbojet engine E and intermediately cooled through the first stage ram air heat exchanger A and the second stage fuel heat exchanger B. The cooled pressurized bleed air is then communicated through the variable area turbine nozzle assembly V against the vanes of the turbine T, driving the fuel pump P. The air is expanded and further cooled in the course of its passage through the turbine. Expanded discharge air from the turbine vanes 24 is collected in a conduit 26, and because of the expansion and work done by the bleed air as it moves through the vanes 24, the much desired additional cooling is effected for prompt use in cooling adjacent accessories or components in the aircraft.

The output of the pump P is controlled by varying the speed of the turbine T, which is accomplished by proportionately varying the area of the turbine nozzle assembly V, in response to a signal from the fuel control device F and actuator G.

The spring biased clutch assembly K, mechanically connects the fuel pump P to the main compressor shaft 11, during idle or low bleed pressure operating conditions, and automatically disengages the pump P whenever a predetermined bleed air pressure is obtained along the pressure responsive face 33 of the piston 34.

Although only one embodiment of the present invention is illustrated in the accompanying figure, it should be understood that many other modifications and variations may be effected without departing from the scope of the novel concepts of the present invention.

I claim as my invention:

1. A combination fuel pumping and refrigeration system for turbojet engines and the like comprising: an air turbine; conduit means for introducing bleed air from the compressor of said turbojet engine to said air turbine; fuel pump means driven by said air turbine; a heat exchanger for said conduit means; conduit means for introducing ram air into said heat exchanger; conduit means leading from said air turbine and communicating with said heat exchanger; temperature critical components in heat exchange relationship with said conduit means leading from said air turbine and in communication with said heat exchanger, and means for selectively admitting ram air or air from said means leading from said air turbine communicating with said heat exchanger into said heat exchanger to provide a suitable temperature for said temperature sensitive components.

2. In a combination fuel pumping and refrigeration system for a turbojet engine powered aircraft and the like having a compressor, a regenerative cooling system comprising: means for bleeding pressurized air from said engine compressor; an air turbine driven pump means pumping fuel for said engine and receiving a driving flow of pressurized air from said compressor; heat exchanger means between said pressurized air bleed means and said air turbine driven pump means; temperature critical components for said engine and conduit means in heat exchange relationship with said temperature critical components receiving expanded relatively cold air from said air turbine driven pump means and returning said relatively cold air to said heat exchanger means to provide cooling for the bleed air such as to afford effective cooling of said temperature critical components.

3. A high temperature fuel pumping system for a turbojet engine powered aircraft or the like comprising: means for bleeding air from the compressor of said engine; a heat exchanger carried by said aircraft; means communicating said bleed air to said heat exchanger to cool said bleed air; an air turbine carried by said engine, means communicating cooled bleed air from said heat exchanger to said air turbine; fuel pump means driven by said air turbine; variable area nozzle means connected to said means communicating cooled bleed air from said heat exchanger to said air turbine; means controlled by the fuel flow requirements of said engine and varying the area of said nozzle means to vary the rate of the turbine and the fuel pump means driven thereby; means for ducting air exhausted from said turbine in heat exchange relationship for cooling temperature sensitive components of said aircraft, and means for ducting said air from heat exchange relationship with said temperature sensitive components to said heat exchanger for cooling bleed air from said compressor.

4. A fuel system for a turbo-jet engine having an air compressor which comprises conduit means for bleeding air from said compressor, a turbine driven by air from said conduit means, an air cooled heat exchanger between said compressor and said turbine and cooling the air in said conduit means, a fuel cooled heat exchanger between said air cooled heat exchanger and said turbine and cooling the air in said conduit means below the level afforded by said air cooled heat exchanger, pump means driven by said turbine, conduit means supplying fuel to said fuel cooled heat exchanger connected with said pump means, and means for ducting air exhausting from said turbine to said air cooled heat exchanger.

5. A high temperature fuel pumping system for a turbojet engine powered aircraft or the like comprising means for bleeding air from the compressor of said engine, a heat exchanger carried by said aircraft, means communicating said bleed air to said heat exchanger to cool said bleed air, an air turbine carried by said engine, means communicating cooled bleed air from said heat exchanger to said air turbine, fuel pump means driven by said air turbine, variable area nozzle means connected to said means communicating cooled bleed air from said heat exchanger to said air turbine, and means controlled by the fuel flow requirements of said engine and varying the area of said nozzle means to vary the rate of the turbine and the fuel pump means driven thereby, and means for ducting air exhausting from said turbine to said heat exchanger.

6. A supplementary regenerative cooling system for augmenting cooling in a combination pump and refrigeration system for temperature critical components of a turbo-jet engine powered aircraft or the like comprising means for bleeding pressurized air from the compressor of said turbo-jet engine, an air turbine conduit means leading said compressed air to said turbine, a pump driven by said turbine, a first heat exchanger for said conduit means disposed between said compressor and said turbine having a ram air inlet and a ram air outlet formed therein, a second heat exchanger for said conduit means disposed between said first heat exchanger and said turbine having a cool fuel inlet and a warm fuel outlet formed therein, conduit means registering with a source of ram air for supplying ram air to said first heat exchanger, conduit means for registering with a source of cool fuel for supplying cool fuel to said second heat exchanger, valve means in said ram air conduit to control the flow therethrough, a collector conduit means around said turbine for receiving relatively cold discharge air therefrom and selectively flowing said air to said ram air inlet, and valve means in said collector conduit for controlling the flow therethrough whereby said supplementary regenerative cooling system may be selectively activated to produce a limited supply of relatively cold discharge air from said collector conduit means.

References Cited in the file of this patent

UNITED STATES PATENTS

| | | |
|---|---|---|
| 515,585 | Hill | Feb. 27, 1894 |
| 1,440,000 | Bonine | Dec. 26, 1922 |
| 2,487,842 | Whiteman et al. | Nov. 15, 1949 |
| 2,582,848 | Price | Jan. 15, 1952 |
| 2,610,464 | Knoll | Sept. 16, 1952 |
| 2,612,020 | Griffith | Sept. 30, 1952 |
| 2,678,542 | Stanton | May 18, 1954 |
| 2,715,814 | Barr | Aug. 23, 1955 |
| 2,739,442 | Neal et al. | Mar. 27, 1956 |
| 2,851,863 | Theed | Sept. 16, 1958 |
| 2,874,540 | Esmeier | Feb. 24, 1959 |

FOREIGN PATENTS

| | | |
|---|---|---|
| 495,544 | Great Britain | Nov. 15, 1938 |
| 738,895 | Great Britain | Oct. 19, 1955 |
| 741,433 | Great Britain | Dec. 7, 1955 |